United States Patent
Kogiantis et al.

(10) Patent No.: US 6,898,441 B1
(45) Date of Patent: May 24, 2005

(54) COMMUNICATION SYSTEM HAVING A FLEXIBLE TRANSMIT CONFIGURATION

(75) Inventors: Achilles George Kogiantis, Madison, NJ (US); Mehmet Oguz Sunay, Summit, NJ (US); Harish Viswanathan, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 499 days.

(21) Appl. No.: 09/660,095

(22) Filed: Sep. 12, 2000

(51) Int. Cl.[7] ............................. H04B 1/38; H04M 1/00
(52) U.S. Cl. ............................ 455/562.1; 455/575.7; 455/550.1; 455/101
(58) Field of Search ............................. 455/561, 562.1, 455/60, 550, 445, 522, 552, 553, 101, 575.7; 370/208, 335, 200, 203

(56) References Cited

U.S. PATENT DOCUMENTS

| | | | | |
|---|---|---|---|---|
| 5,140,695 A | * | 8/1992 | Yasuda et al. | ............... 455/450 |
| 5,628,052 A | * | 5/1997 | DeSantis et al. | ......... 455/562.1 |
| 5,666,649 A | | 9/1997 | Dent | |
| 5,722,051 A | * | 2/1998 | Agrawal et al. | ............... 455/69 |
| 5,794,145 A | * | 8/1998 | Milam | ..................... 455/426.1 |
| 5,859,874 A | * | 1/1999 | Wiedeman et al. | .......... 375/267 |
| 6,006,117 A | * | 12/1999 | Hageltorn et al. | ........ 455/575.7 |
| 6,201,967 B1 | * | 3/2001 | Goerke | ..................... 455/435.1 |
| 6,208,297 B1 | * | 3/2001 | Fattouche et al. | ........ 455/456.6 |
| 6,392,988 B1 | * | 5/2002 | Allpress et al. | ............. 370/208 |
| 6,456,604 B1 | * | 9/2002 | Lee et al. | ..................... 370/328 |
| 6,542,736 B1 | * | 4/2003 | Parkvall et al. | ............. 370/465 |
| 6,594,226 B1 | * | 7/2003 | Benning et al. | ............ 370/208 |
| 6,600,934 B1 | * | 7/2003 | Yun et al. | ................ 455/562.1 |

FOREIGN PATENT DOCUMENTS

| | | | | |
|---|---|---|---|---|
| EP | 0 966 125 A | 12/1999 | ............. H04L/1/12 |
| WO | WO 99 14871 A | 3/1999 | ............. H04B/7/06 |
| WO | WO 99 39454 A | 8/1999 | ............. H04B/7/04 |

OTHER PUBLICATIONS

Z. Sayeed, "Throughput Analysis and Design of Fixed and Adaptive ARQ/Diversity Systems For Slow Fading Channels", IEEE GLOBECOM 1998, Nov. 8–12, 1998, pp. 3686–3691.

* cited by examiner

*Primary Examiner*—David Hudspeth
*Assistant Examiner*—Kamran Afshar

(57) ABSTRACT

A communication system's transmit configuration is reconfigured based on mobile station associated conditions such as the capability of the mobile receiver, carrier to interference or signal to noise ratios, and the degree of mobility associated with the mobile station. As a result, the transmit configuration is optimized for the conditions associated with a particular mobile receiver. In one embodiment, the transmit configuration may be selected to operate in configurations such as a single transmit antenna configuration, a space time spreading configuration, a selective transmit diversity, and a multi-output and multi-input configuration.

29 Claims, 1 Drawing Sheet

COMMUNICATION SYSTEM HAVING A FLEXIBLE TRANSMIT CONFIGURATION

BACKGROUND OF THE INVENTION

1. Field of the Invention

The present invention relates to communications; more specifically, wireless communications.

2. Description of the Related Art

Prior communication systems have been designed around one type of transmit configuration. In older systems, a single antenna is used for transmitting. In newer systems, one of several other types of transmit configurations have been used but they did not provide flexibility to address channel conditions such as the degree of mobility associated with a mobile station.

SUMMARY OF THE INVENTION

The present invention provides a communication system with a transmit configuration that may be reconfigured based on mobile station associated conditions such as the capability of the mobile receiver, carrier to interference or signal to noise ratios, and the degree of mobility associated with the mobile station. As a result, the transmit configuration is optimized for the conditions associated with a particular mobile receiver. In one embodiment, the transmit configuration may be selected to operate in configurations such as a single transmit antenna configuration, a space time spreading configuration, a selective transmit diversity configuration, and a multi-output and multi-input configuration.

DETAILED DESCRIPTION

When a mobile station initially makes contact with a base station requesting a communication channel, it transmits information such as its electronic serial number (ESN), and mobile associated channel conditions such as carrier to interference ratio $$\left(\frac{C}{I}\right),$$

signal to noise ratio $$\left(\frac{S}{N}\right),$$

the mobile station's degree of mobility (whether the mobile is standing still, moving slowly or moving at a relatively high speed) and the transmit configurations supported by the mobile. Additionally, the base station transmits its capabilities to mobile stations on a channel such as a paging channel or synchronization channel where is indicates the types of transmit configurations that are available. In one embodiment, based on the information provided by the mobile station and the capabilities of the base station, the base station provides one of four different transmit configurations for communications with the mobile station. The selected transmit configuration is communicated to the mobile station using a control channel such as a paging channel or synchronization channel.

In one embodiment, the four transmit configurations are a single transmit antenna configuration, a selective transmit diversity configuration, a space time spreading configuration and a multi-input/multi-output configuration. The use of these four configurations is provided for instructional purposes. Different numbers and different types of configurations may be used.

Figure 1:
FIG. 1 illustrates a single transmit antenna configuration.

FIG. 1 illustrates a single transmit antenna configuration. Base station 10 communicates with mobile 20 using a single antenna at both the base station and mobile station. This configuration may be the default configuration and is typically assigned when the mobile has a high degree of mobility. High degrees of mobility correspond to times such as when the mobile station is in a motor vehicle or a train.

Figure 2:
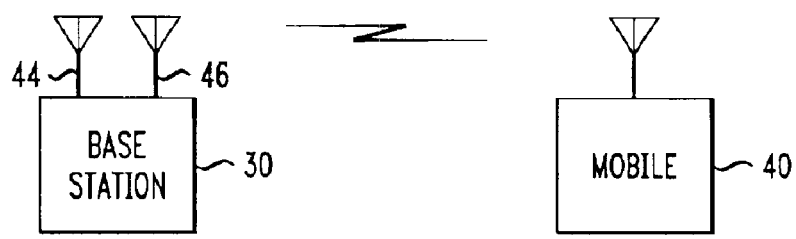
FIG. 2 illustrates a selective transmit diversity configuration.

FIG. 2 illustrates a selective transmit configuration. In this configuration, base station 30; communicates with mobile station 40 using one of multiple transmit antennas and one antenna at the mobile station. Communications are tested using each of antennas 44 and 46, and then the mobile reports to the base station which of the two antennas provided superior communications. Superior communications may be determined using factors such as carrier to interference ratios, signal to noise ratios or error rates. This configuration is typically used when there are poor channel conditions such as low carrier to interference ratio and the mobile has a low level of mobility. Low mobility corresponds to situations such as the mobile being stationary or being carried by a user as he or she walks.

Figure 3:
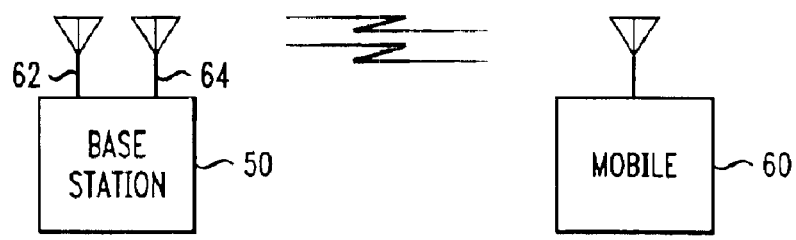
FIG. 3 illustrates a space time spreading configuration.

FIG. 3 illustrates a space time spreading configuration. Base station 50 communicates with mobile station 60 using at least two transmit antennas at the base station simultaneously and one receive antenna at the mobile station. In this configuration each of the transmit antennas uses a different Walsh code for the data that is transmitted through the antenna. In the case of two antennas as illustrated in the figure, antennas 62 and 64 carry data encoded with different orthogonal codes such as Walsh codes. This type of configuration is typically used in situations where channel conditions are good; that is, the carrier to interference ratio or signal to noise ratio is high and the mobility of the mobile station is low.

Figure 4:
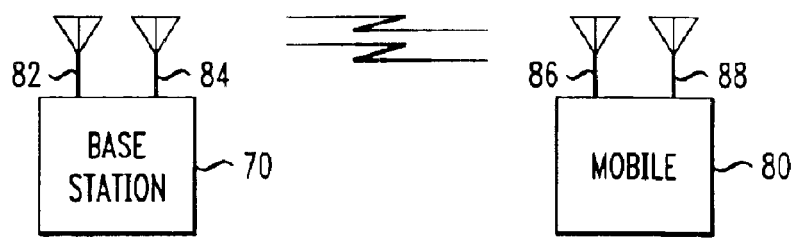
FIG. 4 illustrates a multi-output and multi-input configuration.

FIG. 4 illustrates a multi-input/multi-output transmit configuration. In this configuration base station 70 transmits to mobile station 80 using at least two transmit antennas and mobile station 80 receives the signals using at least two receive antennas. In this configuration data is simultaneously transmitted on antennas 82 and 84, and it is received by antennas 86 and 88. This type of configuration is typically used where there are good channel conditions such as a high carrier to interference ratio or signal to noise ratio, where the mobility of the mobile station is low, and where the mobile station has multiple receive antennas.

Other types of known configurations may be used or a subset of the above described configurations may be used based on the capabilities of the base station and mobile station associated channel conditions such as the capabilities of the mobile station, carrier to interference ratio, the signal to noise ratio and the mobile station's mobility.

The invention claimed is:

1. A method for reconfiguring a communication system, comprising the steps of:

receiving, from a mobile station, a plurality of mobile station capabilities and selecting one of a plurality of transmit configurations using at least one of the plurality of mobile station capabilities received, the plurality of mobile station capabilities including at least two capabilities from a list including a single transmit antenna configuration, a space time spreading configuration, a selective transmit diversity configuration, and a multi-input/multi-output configuration.

2. The method of claim 1 further comprising:

receiving channel quality information and wherein, the selecting step includes selecting one of the plurality of transmit configurations using the channel quality information received and at least one of the plurality of mobile station capabilities received.

3. The method of claim 2 further comprising:

receiving information on mobility of the mobile station; and wherein, the selecting step selects one of the plurality of transmit configurations using at least one of the plurality of mobile station capabilities, channel quality information, and the information on the mobility of the mobile station.

4. The method of claim 2 wherein, the channel quality information includes information on a carrier to noise ratio of a communication channel.

5. The method of claim 2 wherein, the channel quality information includes information on a signal to noise ratio of a communication channel.

6. The method of claim 2 wherein, the channel quality information includes information on an error rate.

7. The method of claim 2, wherein the step of selecting comprises selecting a single antenna transmit configuration.

8. The method of claim 2, wherein the step of selecting comprises selecting a selection transmit diversity transmit configuration.

9. The method of claim 2, wherein the step of selecting comprises selecting a space time spreading transmit configuration.

10. The method of claim 2, wherein the step of selecting comprises selecting a multi-output and multi-input transmit configuration.

11. The method of claim 2, wherein the step of selecting comprises selecting a configuration that selects one of a plurality of transmit antennas.

12. The method of claim 2, wherein the step of selecting comprises selecting a configuration that transmits using a plurality of transmit antennas.

13. The method of claim 12, wherein the step of selecting comprises selecting a configuration that transmits using a plurality of transmit antennas, where each antenna uses a different orthogonal code.

14. The method of claim 13, wherein the step of selecting comprises selecting a configuration that transmits using a plurality of transmit antennas, where each antenna uses a different Walsh code.

15. The method of claim 2 further comprising:

communicating the selected transmit configuration to the mobile station over a control channel.

16. The method of claim 15 wherein, the control channel is at least one of a paging channel and synchronization channel.

17. The method of claim 2 wherein, the plurality of mobile station capabilities includes a plurality of transmit configurations supported by the mobile station.

18. A method for reconfiguring a communication system, comprising the steps of:

receiving, from a mobile station, mobility information of the mobile station and a plurality of transmit configurations;

selecting at least one of the plurality of transmit configurations received using the mobility information received, the plurality of transmit configurations including at least two of a single transmit antenna configuration, a space time spreading configuration, a selective transmit diversity configuration, and a multi-input configuration.

19. The method of claim 18 further comprising:

receiving channel quality information and wherein, the selecting step includes selecting one of a plurality of transmit configurations received using the mobility information received and the channel quality information received.

20. A method for reconfiguring a communication system, comprising the steps of:

sending, from a mobile station, a plurality of mobile station capabilities; and receiving, by the mobile station, a selected transmit configuration of a plurality of transmit configurations that is based on at least one of the mobile station capabilities sent, the plurality of transmit configurations including at least two of a single transmit antenna configuration, a space time spreading configuration, a selective transmit diversity configuration, and a multi-input configuration.

21. The method of claim 20 further comprising:

sending, from the mobile station, channel quality information and wherein, the receiving, by the mobile station, includes receiving a selected transmit configuration that is based on the channel quality information sent and at least one of the plurality of mobile station capabilities sent.

22. The method of claim 21, further comprising:

sending, from the mobile station, mobility information of the mobile station and wherein, the receiving, by the mobile station, includes receiving the selected transmit configuration that is based on the channel quality information sent, the mobility information sent, and at least one of the mobile station capabilities sent.

23. A method for reconfiguring a communication system, comprising the steps of:

sending, from a mobile station, mobility information of the mobile station; and receiving, by the mobile station, a selected transmit configuration of a plurality of transmit configurations, the plurality of transmit configurations including at least two of a single transmit antenna configuration, a space time spreading configuration, a selective transmit diversity configuration, and a multi-input configuration.

24. The method of claim 23 further comprising:

sending, from the mobile station, channel quality information and wherein, the receiving, by the mobile station, includes receiving the selected transmit configuration based on the mobility information sent and the channel quality information sent.

25. A method for reconfiguring a communication system, comprising the steps of:

receiving, from a mobile station, channel quality information and a plurality of transmit configurations supported by the mobile station;

selecting one of the plurality of transmit configurations received using the channel quality information received, the plurality of transmit configurations including at least two of a single transmit antenna configuration, a space time spreading configuration, a selective transmit diversity configuration, and a multi-input configuration.

26. The method of claim 25 further comprising transmitting using the selected one of the plurality of transmit configurations.

27. A method for reconfiguring a communication system, comprising the steps of:

sending, from a mobile station, a plurality of transmit configurations supported by the mobile station; and receiving, by the mobile station, a selected transmit configuration that is based on at least one of the plurality of transmit configurations sent, the plurality of transmit configurations including at least two of a single transmit antenna configuration, a space time spreading configuration, a selective transmit diversity configuration, and a multi-input configuration.

28. The method of claim 27 further comprising receiving, by the mobile station, transmissions using the selected transmit configuration.

29. The method of claim 1, wherein, the single transmit antenna configuration involves receiving, using a first single antenna, a signal from one antenna of the mobile station used to transmit the signal; the selective transmit configuration involves selecting one of a plurality of antennas to communicate with the one antenna of the mobile station; the space time spreading configuration involves using a plurality of antennas to communicate with the one antenna of the mobile station; the multi-input configuration involves using a plurality of antennas to communicate with a plurality of antennas of the mobile station.

* * * * *